(12) United States Patent
Münzer

(10) Patent No.: US 7,336,376 B2
(45) Date of Patent: Feb. 26, 2008

(54) MEASURING PYRAMID SIZE ON A TEXTURED SURFACE

(75) Inventor: Adolf Münzer, Unterschleißheim (DE)

(73) Assignee: SolarWorld Industries Deutschland GmbH, München (DE)

( * ) Notice: Subject to any disclaimer, the term of this patent is extended or adjusted under 35 U.S.C. 154(b) by 322 days.

(21) Appl. No.: 11/009,739

(22) Filed: Dec. 10, 2004

(65) Prior Publication Data

US 2005/0162666 A1    Jul. 28, 2005

(30) Foreign Application Priority Data

Dec. 12, 2003  (EP)  .................................. 03028465

(51) Int. Cl.
*G01B 11/14* (2006.01)
*G01N 21/86* (2006.01)

(52) U.S. Cl. .................................. 356/625; 250/559.19

(58) Field of Classification Search ...................... None
See application file for complete search history.

(56) References Cited

U.S. PATENT DOCUMENTS

| | | | | |
|---|---|---|---|---|
| 3,782,827 A | * | 1/1974 | Nisenson et al. ........... | 356/600 |
| 3,782,836 A | | 1/1974 | Fey ............................. | 356/209 |
| 3,850,526 A | | 11/1974 | Corey, III .................... | 356/109 |
| 4,137,123 A | * | 1/1979 | Bailey et al. ................ | 438/753 |
| 4,615,620 A | * | 10/1986 | Noguchi et al. ............ | 356/626 |
| RE33,424 E | * | 11/1990 | Noguchi et al. ............ | 356/626 |
| 5,032,734 A | | 7/1991 | Orazio, Jr. et al. ......... | 250/572 |
| 5,539,213 A | * | 7/1996 | Meeks et al. ........... | 250/559.23 |
| 5,581,346 A | | 12/1996 | Sopori ......................... | 356/30 |
| 5,951,891 A | * | 9/1999 | Barenboim et al. ..... | 219/121.68 |
| 5,978,091 A | * | 11/1999 | Jann et al. ................... | 356/613 |
| 6,191,849 B1 | | 2/2001 | Maeshima et al. ........ | 356/237.1 |
| 6,388,229 B1 | * | 5/2002 | Baumgart et al. ..... | 219/121.62 |
| 6,451,218 B1 | * | 9/2002 | Holdermann ................ | 216/99 |
| 6,646,751 B2 | * | 11/2003 | Kishimura .................. | 356/626 |

OTHER PUBLICATIONS

PCT Written Opinion dated Mar. 21, 2005.
PCT International Search Report.
J. A. Mazer, Solar Cells: An Kluwer Academic Publishers, 1997, pp. 136-138.

* cited by examiner

*Primary Examiner*—Gregory J. Toatley, Jr.
*Assistant Examiner*—Jonathan Skovholt
(74) *Attorney, Agent, or Firm*—McGlew and Tuttle, P.C.

(57) ABSTRACT

A method for measuring pyramid size of pyramids outwardly extending on a textured surface of an object, which method involves emitting from a light source a light beam along a first direction onto a region of the textured surface, measuring an intensity of light received from that region along a second direction, and processing the measured intensity to obtain an average size of pyramids; and a device suitable for measuring pyramid size according to the method.

20 Claims, 1 Drawing Sheet

MEASURING PYRAMID SIZE ON A TEXTURED SURFACE

Figure 1:
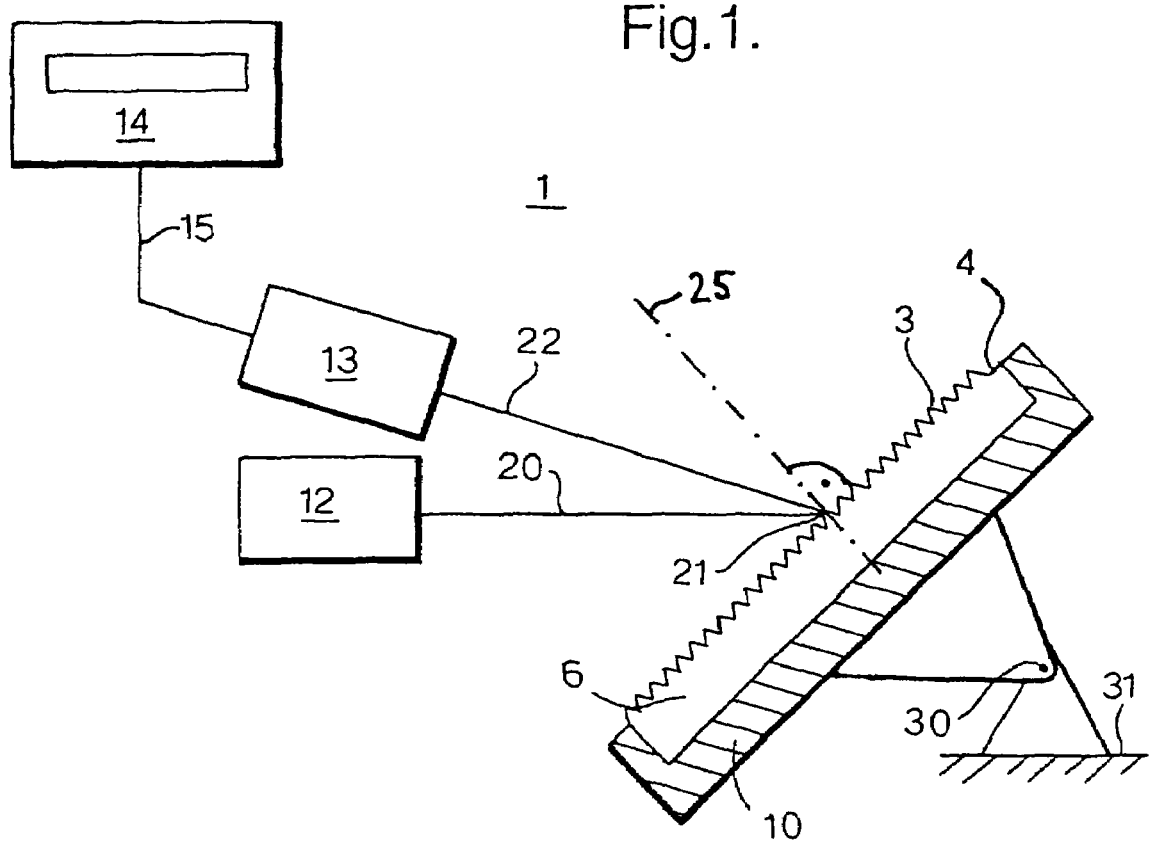

The present invention relates to a method and device for measuring pyramid size of pyramids on a textured surface of an object. An example of such an object is a wafer for a photovoltaic cell, wherein the light-receiving surface is textured in order to improve the efficiency of the photovoltaic cell.

Texturing can be done by means of chemical etching, see for example J. A. Mazer, Solar Cells: An introduction to crystalline photovoltaic technology, Kluwer Academic Publishers, 1997, pages 136-138. The etchant used is an anisotropic etchant, and in combination with a particular crystallographic orientation of a surface of a wafer to be treated, pyramids extending outwardly on the surface of the wafer can be produced. Chemically etching a surface will produce pyramids of sizes in the range of 1-20 micrometers. It will be understood that the sizes are distributed around an average value. In the specification and in the claims the expression 'size of the pyramids' is used to refer to the height of the pyramids. In particular the pyramids can have substantially the same shape determined by the crystallographic properties of the wafer material. For example, all pyramids can have a quadratic base, substantially planar surfaces extending from the base and a substantially fixed ratio of height above the surface and base length.

It is generally believed that the efficiency of photovoltaic cells does not depend on the size of the pyramids on the textured surface of a wafer. However, Applicant had found that some manufacturing processes depend on the surface roughness. An example of such a process is doping the wafer with a liquid dopant solution in order to manufacture a surface layer having a doping that differs from the doping of the wafer. Doping the wafer is done after texturing the surface of the wafer, and the size of the pyramids affects the distribution of the liquid dopant solution and consequently the efficiency of the photovoltaic cell. The efficiency increases in inverse proportion to the size of the pyramids on the textured surface. In order to improve the efficiency of the cell, the pyramids should have a small average size. This not only requires a suitable etchant, but the size of the pyramids has to be measured in a practical way.

Normally the size of the pyramids is measured with a microscope or an electron microscope. However, such microscopes will only give a spot measurement. In order to determine the average size a large number of spot measurements has to be made. This is not practical.

U.S. Pat. No. 3,782,836 discloses a surface irregularity analysing system and method for determining the number and location of defects in the surface of a body of semiconductor material. Light is irradiated onto the surface along a direction that deviates from the normal of the surface. Light that is reflected by etch pits, which can have the shape of pyramids inwardly extending into the surface, is detected parallel to the normal of the surface. A higher intensity of reflected light is interpreted as corresponding to a higher number of etch pits.

U.S. Pat. No. 5,581,346 discloses an apparatus and method for mapping defects in the surfaces of polycrystalline material, in a manner that distinguishes dislocation pits from grain boundaries. Laser light is irradiated perpendicular onto the surface (i.e. parallel to the normal of the surface). Light that is scattered by etch pits on the surface into a plurality of directions more that 5 degrees away from the normal, is collected by an integrating sphere, and a photodetector positioned laterally in the integrating sphere determines an intensity of diffused light in the integrating sphere. An etch pit density is determined from a linear relationship between etch pit density and a normalized diffused light intensity, wherein it has been observed that the slope of the relationship depends on the size of etch pits.

It is desirable to provide a method for determining of the average size of pyramids produced on a textured surface.

It is also desirable to provide a device that enables a practical measurement of the average size of the pyramids on a textured surface.

In accordance with the present invention there is provided a method for measuring pyramid size of pyramids outwardly extending on a textured surface of an object, which method comprises emitting from a light source a light beam along a first direction onto a region of the textured surface, measuring an intensity of light received from that region along a second direction, and processing the measured intensity to obtain an average size of pyramids.

Preferably, the first and second directions are substantially collinear, so that the light received along the second direction can be regarded as reflected light. It is understood that, because of the dimensions of the light source and the dimension of a detector for measuring the light intensity, the first and second directions will in general not be precisely collinear. The term 'reflected light' is used herein in this meaning, but it will be understood that the light received in a substantially collinear arrangement can also comprise or be formed of light that is scattered or diffracted back into the direction of the incident light.

Light that is scattered or diffracted in other directions can in principle also be used. The first and second directions are chosen accordingly. Suitably, the first and second directions deviate from the direction normal to the textured surface.

Suitably, the light beam is a beam of plane waves, which corresponds to a parallel light bundle. Preferably the divergence angle (total opening angle) defining the deviation from a parallel bundle is 20 degrees or less, more preferably 10 degrees or less, most preferably 5 degrees or less.

There is also provided a device for measuring pyramid size of pyramids on a textured surface of an object, which device comprises an object holder which is configured so as to hold the object, a light source having an optical axis arranged to emit during normal operation a light beam along a first direction onto a region of the textured surface, a detector having an optical axis arranged to measure during normal operation the intensity of light received from the region along a second direction, wherein the first and second directions deviate from the direction normal to the textured surface of the object when held by the object holder, and a processor for further processing the measurements of the detector.

The present invention is based on a discovery made when observing sunlight reflected by the textured surface of an object. It appears that the lustre of the textured surface, which is the intensity of the reflected sunlight, can be correlated with the average size of the pyramids. The correlation that was found was that intensity increased with increasing average size of the pyramids.

Without wishing to be bound by the following hypothesis, it is believed that the effect is based on the following observations and considerations. It has been observed that a parallel light bundle incident on a pyramidal textured surface gives rise to triangular reflections that are scattered the more the smaller the pyramids are. Although the integral of the light intensity in all directions will be constant, the scattering causes a decrease of the light intensity observed within a predetermined solid angle of the space. The scattering is likely caused by the diffraction at the pyramid corners, and the V-shaped slits between pyramids. The smaller the pyramids, the larger the diffraction will be. For larger pyramids the directly reflected light intensity from their faces is higher than for smaller pyramids.

It shall be understood that the same principle can be applied when observing light diffracted or scattered from the region of the surface, onto which the light beam is emitted, away from the first direction. The second direction along which the scattered or diffracted light is received and measured is then suitably away from the first direction, along which the light beam is emitted onto the surface. A calibration measurement can be used to establish the relationship between the intensity of such scattered or diffracted light in a given direction (solid angle in space) and pyramid size.

Figure 2:
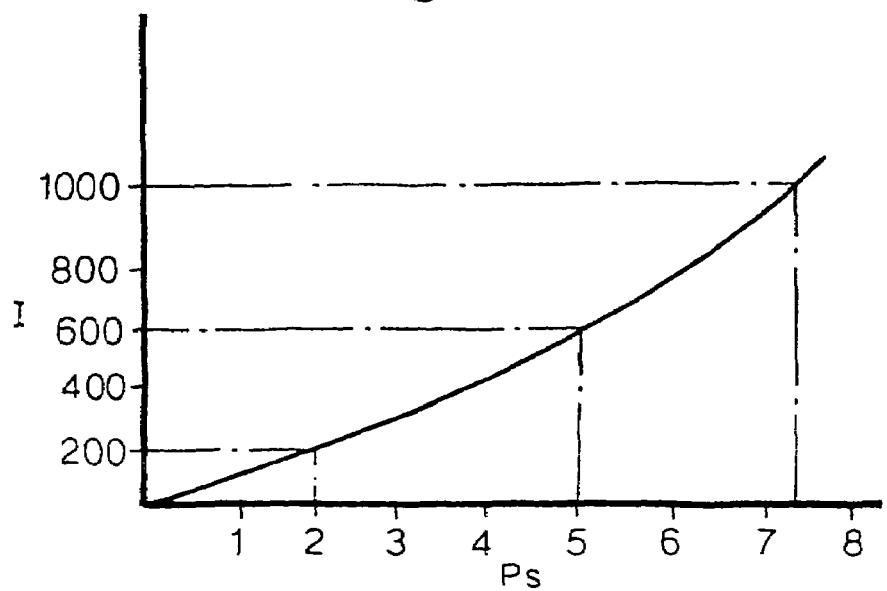

The invention will now be described by way of example in more detail with reference to the accompanying drawings, wherein FIG. 1 shows schematically and not to scale a preferred embodiment of the device of the present invention; and FIG. 2 is a schematic diagram of the intensity of the reflected light as a function of the average pyramid size.

Reference is now made to FIG. 1 showing the device 1 for measuring the size of pyramids 3 outwardly extending on a textured surface 4 of an object in the form of a plane wafer 6.

The device 1 comprises an object holder 10, a light source 12, a detector 13, and a processor for further processing the measurements of the detector 13 in the form of a display 14 electronically connected to the detector 13 by means of a wire 15.

During normal operation the light source 12 emits a beam of plane waves in the direction of its optical axis 20 (first direction). The beam of plane waves is emitted onto a region 21 of the textured surface 4 to receive light that is reflected from the region 21. The detector 13, which has an optical axis 22, measures the intensity of the reflected light that is received in this direction (second direction). The intensity of the reflected light is then displayed on the display 14. Both optical axes 20 and 22 deviate from the normal 25 of the surface 4, suitably by more than 5 degrees, such as by 10 degrees or more.

Suitably the light source 12 is a laser, although other light sources may also be used, such as for example a conventional light bulb. If a point light source is used, a substantially parallel light bundle can be obtained by employing an optical system, for example by placing the light source substantially in the focus of a convex lens. To enable determining an average size of the pyramids, the cross-sectional area of the beam is not critical, but preferably between 0.2 and 2 cm².

It will be understood that the pyramids outwardly extending from a surface after an etching process will have a certain distribution of size, e.g. 2±0.5 µm, or 2(−1/+3) µm. When a relatively large region of the surface compared to the pyramid size is irradiated, an average size is measured. It will be understood that the result of applying the method of this invention, referred to herein as pyramid size, is a practical and useful characterization of the surface, in particular the surface roughness. It is not critical to the invention whether the result is a representation of the height of pyramids or of base dimensions of pyramids.

In order to obtain a meaningful measurement, the textured surface are preferably so oriented that the intensity of the reflected light is highest.

For a given combination of light source and detector the highest intensity is separately correlated with the average size of the pyramids 3. FIG. 2 shows schematically such a correlation. On the horizontal axis is displayed the pyramid size, Ps, in micrometer and on the vertical axis the intensity, I, of the reflected light in arbitrary units for a given combination of light source and detector.

Once the correlation has been established, for example using a plurality of objects with known average pyramid size, the (highest) intensity of the reflected light of an unknown object for a given combination of light source and detector can be converted into average pyramid size. This conversion can then be carried out by the processor for further processing the measurements. Then, instead of the intensity, the display 14 shows the average size. Instead of a size one can as well display an indication of the size of the pyramids 3, for example small (intensity between 0 and 200 units, size between 1 and 2 micrometer), medium (intensity between 200 and 600 units, size between 2 and 5 micrometer) and large (intensity larger than 600 units, size larger than 5 micrometer).

As stated above, in order to obtain a meaningful measurement, the textured surface is preferably so oriented that intensity of the reflected light is highest. To maximize the intensity of the reflected light, the device further includes a system to change the position of the object 6, the optical axis 20 of the light source 12 and the optical axis 22 of the detector 13.

Suitably, for measuring reflected light the optical axes 20 and 22 of the light source 12 and the detector 13 are collinear. However, this cannot always be achieved, so that in general the optical axes 20 and 22 are substantially collinear. Suitably the angle between the optical axes 20 and 22 is 20 degrees or less, preferably 10 degrees or less, more preferably 5 degrees or less.

An example wherein the optical axes 20 and 22 are substantially collinear is shown in FIG. 1, wherein the light source 12 and the detector 13 are arranged on top of each other and fixed to each other. The light source 12 and the detector 13 are so directed that optical axes 20 and 22 intersect at or near the textured surface 4 of the object 6. It shall be clear that in the schematic drawing the angle between the optical axes has been exaggerated.

In case the light source 12 and the detector 13 are fixed to each other, the intensity of the reflected light can easily be maximized by rotating the object holder 10 about an axis that is perpendicular to both the optical axis 20 of the light source 12 and the optical axis 22 of the detector 13. Thereto, the device is provided with a hinge 30 connecting the object holder 10 to a fixed reference 31, which can be a frame (not shown) supporting the assembly of light source 12 and detector 13. The hinge 30 connects the object holder 10 such that the object holder 10 is rotatable about an axis (not shown) that is perpendicular to both the optical axis 20 of the light source 12 and the optical axis 22 of the detector 13. In the embodiment of the invention shown in FIG. 1, the optical axis 20 and 22 lay in the plane of drawing, and therefore the axis of rotation is perpendicular to the plane of drawing.

The present invention provides a simple device for measuring the size of pyramids on a textured surface of an object, such as a wafer of a photovoltaic cell.

What is claimed is:

1. A method for measuring pyramid size of pyramids outwardly extending on a textured surface of an object, the method comprising:

emitting from a light source a light beam along a first direction onto a region of the textured surface;

measuring an intensity of light reflected from said region along a second direction; and providing a processor, said processor processing the measured intensity to determine an average size of pyramids, said average size of pyramids being determined by using a predetermined relationship between the intensity of light received along the second direction and pyramid size, wherein the pyramid size increases with increasing intensity of received light.

2. The method according to claim 1, wherein the first and second directions deviate from the direction normal to the textured surface.

3. The method according to claim 1, wherein the light beam is a beam of plane waves.

4. The method according to claim 1, wherein the first and second directions are substantially collinear.

5. The method according to claim 3, wherein the first and second directions deviate from the direction normal to the textured surface, and wherein the first and second directions are substantially collinear.

6. A method for measuring pyramid size of pyramids outwardly extending on a textured surface of an object, the method comprising:
emitting a light beam along a first direction onto a region of the textured surface;
measuring an intensity of light received from said region along a second direction; and
providing a processor, said processor processing the measured intensity to obtain an average size of pyramids, said first direction and said second direction deviating from a direction normal to the textured surface by more than 10 degrees, said average size of pyramids being determined by using a predetermined relationship between the intensity of light received along the second direction and pyramid size, wherein the pyramid size increases with increasing intensity of received light.

7. The method according to claim 6, wherein the first and second directions are substantially collinear.

8. A method for measuring pyramid size of pyramids outwardly extending on a textured surface of an object, the method comprising:
emitting from a light source a light beam along a first direction onto a region of the textured surface;
measuring an intensity of light reflected from said region along a second direction, wherein the position of the object and/or the first direction of incident light, and/or the second direction along which the intensity of light is measured are adjusted such that the intensity of the light received along the second direction is maximized; and
providing a processor, said processor processing the measured intensity to determine an average size of pyramids, said average size of pyramids being determined by using a predetermined relationship between the intensity of light received along the second direction and pyramid size, wherein the pyramid size increases with increasing intensity of received light.

9. The method according to claim 8, wherein the first and second directions deviate from the direction normal to the textured surface.

10. The method according to claim 8, wherein the light beam is a beam of plane waves.

11. The method according to claim 10, wherein the first and second directions deviate from the direction normal to the textured surface, and wherein the first and second directions are substantially collinear.

12. The method according to claim 8, wherein the first and second directions are substantially collinear.

13. The method according to claim 6, wherein the first and second directions deviate from the direction normal to the textured surface.

14. The method according to claim 6, wherein the light beam is a beam of plane waves.

15. The method according to claim 14, wherein the first and second directions deviate from the direction normal to the textured surface.

16. The method according to claim 1, further comprising providing an object holder for holding the object and a detector for measuring said intensity of light reflected from said region along said second direction.

17. The method according to claim 1, further comprising providing a system to change the position of the object and/or the light source and/or the second direction of light such that the intensity of the light received along the second direction is maximized.

18. The method according to claim 16, wherein the light source and the detector are fixed to each other.

19. The method according to claim 16, wherein said object holder is rotatable about an axis perpendicular to said first direction and said second direction.

20. The method according to claim 8, further comprising providing a system to change the position of the object and/or the light source and/or the second direction of light such that the intensity of the light received along the second direction is maximized.

* * * * *